(12) United States Patent
Ohs et al.

(10) Patent No.: US 10,193,172 B2
(45) Date of Patent: Jan. 29, 2019

(54) METHOD FOR STARTING UP A FUEL CELL

(71) Applicant: Robert Bosch GmbH, Stuttgart (DE)

(72) Inventors: Jan Hendrik Ohs, Leonberg (DE);
Sebastian Maass, Renningen-Malmsheim (DE)

(73) Assignee: Robert Bosch GmbH, Stuttgart (DE)

( * ) Notice: Subject to any disclaimer, the term of this patent is extended or adjusted under 35 U.S.C. 154(b) by 353 days.

(21) Appl. No.: 14/902,390

(22) PCT Filed: Jun. 26, 2014

(86) PCT No.: PCT/EP2014/063545
§ 371 (c)(1),
(2) Date: Dec. 31, 2015

(87) PCT Pub. No.: WO2015/000789
PCT Pub. Date: Jan. 8, 2015

(65) Prior Publication Data
US 2016/0372766 A1    Dec. 22, 2016

(30) Foreign Application Priority Data
Jul. 3, 2013    (DE) .................. 10 2013 212 969

(51) Int. Cl.
*H01M 8/04225* (2016.01)
*H01M 8/04082* (2016.01)
(Continued)

(52) U.S. Cl.
CPC ... *H01M 8/04302* (2016.02); *H01M 8/04097* (2013.01); *H01M 8/04201* (2013.01);
(Continued)

(58) Field of Classification Search
CPC ........... H01M 8/04302; H01M 8/2457; H01M 8/04097; H01M 8/04201; H01M 8/04225; H01M 8/04798; H01M 8/04231; H01M 8/04223; H01M 8/08089; H01M 8/043; H01M 8/04388; H01M 8/04753; H01M 8/04761; H01M 8/04402; H01M 8/04447; H01M 8/04462; H01M 2250/20
See application file for complete search history.

(56) References Cited

U.S. PATENT DOCUMENTS

2004/0072042 A1    4/2004  Kim
2006/0046106 A1*   3/2006  Yu ..................... H01M 8/04231
                                                        429/414
(Continued)

FOREIGN PATENT DOCUMENTS

JP    2005116402        4/2005
JP    2005166424    *   6/2005
(Continued)

OTHER PUBLICATIONS

International Search Report for Application No. PCT/EP2014/063545 dated Sep. 17, 2014 (English Translation, 3 pages).
(Continued)

*Primary Examiner* — Ula C Ruddock
*Assistant Examiner* — Matthew W Van Oudenaren
(74) *Attorney, Agent, or Firm* — Michael Best & Friedrich LLP

(57) ABSTRACT

The invention relates to a method (40) for starting up a fuel cell (11), wherein hydrogen is introduced into an anode chamber (15) of the fuel cell (11), and at the beginning of the start-up process oxygen is present in the anode chamber (15) of the fuel cell (11). According to the invention, at the beginning of the hydrogen introduction stage enough hydrogen is introduced to ensure that upon entry into the anode chamber (15) hydrogen and oxygen are present in no more than a stoichiometric ratio.

8 Claims, 2 Drawing Sheets

(51) Int. Cl.
- *H01M 8/04089* (2016.01)
- *H01M 8/04302* (2016.01)
- *H01M 8/2457* (2016.01)
- *H01M 8/04223* (2016.01)
- *H01M 8/04746* (2016.01)
- *H01M 8/04791* (2016.01)

(52) U.S. Cl.
CPC ... *H01M 8/04223* (2013.01); *H01M 8/04225* (2016.02); *H01M 8/04231* (2013.01); *H01M 8/04753* (2013.01); *H01M 8/04798* (2013.01); *H01M 8/2457* (2016.02); *H01M 2250/20* (2013.01); *Y02T 90/32* (2013.01)

(56) References Cited

U.S. PATENT DOCUMENTS

| | | | |
|---|---|---|---|
| 2010/0035098 A1* | 2/2010 | Ramani | H01M 8/04223 429/429 |
| 2013/0029238 A1 | 1/2013 | Im et al. | |

FOREIGN PATENT DOCUMENTS

| | | |
|---|---|---|
| JP | 2005228709 A | 8/2005 |
| JP | 2006156040 A | 6/2006 |
| JP | 2007179947 A | 7/2007 |

OTHER PUBLICATIONS

Reiser et al., "A Reverse-Current Decay Mechanism for Fuel Cells," Electrochem. Solid-State Lett., 2005, vol. 8 Issue 6, A273-A276.

* cited by examiner

METHOD FOR STARTING UP A FUEL CELL

BACKGROUND OF THE INVENTION

The invention relates to a method for starting up a fuel cell, wherein hydrogen is introduced into an anode chamber of the fuel cell, and at the beginning of the start-up process oxygen is present in the anode chamber of the fuel cell. The invention also relates to a fuel cell system.

During the operation of a fuel cell from the prior art, hydrogen and oxygen are electrochemically converted to water with the aid of a catalyst, which contains platinum applied to carbon particles. When starting up a fuel cell, oxygen can initially be present in a cathode chamber and in the anode chamber of the fuel cell. If hydrogen is now introduced into the anode chamber, a sharp hydrogen/oxygen gas front then develops within the anode chamber, wherein the hydrogen previously introduced is situated in a front region of the fuel cell in the anode chamber and oxygen is situated in the entire cathode chamber and in the anode chamber in a rear region of the fuel cell.

C. A. Reiser et al. describe in "Electrochemical and Solid-State Letters": 8 (6) A273-A276, 2005 the electrochemical processes of a fuel cell in such a state. In the front region of the fuel cell, the hydrogen of the anode chamber can electrochemically react at an anode to form water and the oxygen of the cathode chamber can electrochemically react at a cathode to form water. Due to the high conductivity of the electrodes, the potentials of the anode and the cathode are approximately constant over the front and the rear region. The low conductivity of the electrolyte in comparison to the electrodes has the effect that a high potential difference is present between the cathode and an electrolyte in the rear, oxygen rich region of the fuel cell. In the rear region of the fuel cell, oxygen is now reduced to water at the anode, whereas carbon of the catalyst is oxidized to carbon dioxide with the aid of water at the cathode. As a result, the catalyst loses its effectiveness and the fuel cell degrades. According to Reiser, this process is referred to as the "reverse current decay" mechanism.

SUMMARY OF THE INVENTION

It is the aim of the present invention to provide a method for starting up a fuel cell and a fuel cell system, which in part overcome the disadvantages of the prior art and particularly in which method and system the fuel cell is degraded less quickly or, respectively, is slowly degraded.

In order to meet this aim, a method according to the invention is proposed. The aim is furthermore met by a fuel cell system according to the invention. Features and details which are described in connection with the method according to the invention also apply in connection with the fuel cell system according to the invention and vice versa. In so doing, the features mentioned in the claims and in the description can in each case be essential to the invention in isolation or in combination.

According to the invention, at the beginning of the hydrogen introduction stage enough hydrogen is introduced to ensure that upon entry into the anode chamber hydrogen and oxygen are present in no more than a stoichiometric ratio.

Hydrogen and oxygen therefore arrive at the anode in no more than a stoichiometric ratio, i.e. no more than a ratio of 2:1. Because the proportion of hydrogen with respect to the proportion of oxygen in a volume flow which enters the anode chamber is present in no more than a stoichiometric ratio at the beginning of the hydrogen introduction stage, the hydrogen completely reacts with the oxygen which is present in the anode chamber and in the anode, whereas the quantity of oxygen in the anode chamber and in the anode decreases. A sharp hydrogen/oxygen gas front is therefore prevented in accordance with the invention. The reaction is catalyzed by the platinum that is present. An electrochemical reaction in which the hydrogen of the anode chamber electrochemically reacts with the oxygen of the cathode chamber is, according to the invention, largely prevented. As a result, a high potential difference between the cathode and the electrolyte is prevented in the rear region of the fuel cell. Thus, the undesirable reaction of the catalyst carrier material: carbon at the cathode hardly occurs in the rear region of the fuel cell. The catalyst remains at least largely or, respectively, substantially intact. The fuel cell degrades less quickly than in the prior art.

The fact that, at the beginning of the hydrogen introduction stage, hydrogen and oxygen are present in no more than a stoichiometric ratio upon entry into the anode chamber means that the mole fraction of hydrogen upon entry into the anode chamber at the beginning of the hydrogen introduction stage is no more than twice as high as the mole fraction of oxygen in the anode chamber prior to starting up the fuel cell. If, e.g., the anode chamber is filled with air prior to starting up the fuel cell and the mole fraction of oxygen in the anode chamber is therefore approximately 0.21, the mole fraction of hydrogen then lies at no more than 0.42 upon entry into the anode chamber at the beginning of the hydrogen introduction stage. "At the beginning of the hydrogen introduction stage" refers here to a time range in which the oxygen has not yet reacted in the anode chamber.

At the beginning of the hydrogen introduction stage, the mole fraction of the hydrogen preferably lies below the mole fraction of the oxygen upon entry into the anode chamber. That means the ratio of hydrogen to oxygen upon entry into the anode chamber at the beginning of the hydrogen introduction stage lies below a 1:1 ratio. Oxygen is therefore present in excess. It has been shown here that the degradation was able to be better prevented as a result of such a small quantity of hydrogen. The mole fraction of the hydrogen lies preferably between 30% and 70%, very preferably between 40% and 65%, of the mole fraction of oxygen upon entry into the anode chamber at the beginning of the hydrogen introduction stage. If air is present in the anode chamber prior to starting up the fuel cell, the mole fraction of the hydrogen then lies preferably between 0.06 and 0.15, very preferably between 0.09 and 0.13 upon entry into the anode chamber at the beginning of the hydrogen introduction stage. In the especially preferred value range, a degradation of the fuel cell was able to be reduced by values between 73% and 49% without greatly delaying the start-up of the electrical power output of the fuel cell. The method according to the invention can be concluded within ten seconds, preferably within five seconds and especially preferably within three seconds.

The ratios between hydrogen and oxygen mentioned above are in each case based on the entry into the anode chamber. The ratios are particularly based on a volume segment of an anode inlet stream prior to entry into the fuel cell. The ratio of hydrogen to oxygen changes by means of the reactions within the fuel cell; thus enabling another ratio of hydrogen to oxygen to prevail in an anode outlet stream.

The anode chamber is disposed above an anode, at which the hydrogen reacts. The anode chamber can be designed as a gas channel and particularly contain a gas diffusion layer by way of design. The anode catalyst layer can contain platinum as the catalyst. The anode of the fuel cell is used to oxidize the hydrogen introduced into the anode chamber. The fuel cell also has a cathode for reducing oxygen. In this way, air containing oxygen can be introduced into a cathode chamber, whereat the cathode is situated, by means of a compressor. An electrolyte, by way of example a solid state electrolyte, e.g., a membrane, can be situated between the anode and the cathode. An inlet valve can be disposed between a hydrogen tank and the anode chamber for metering a hydrogen supply. A supply line is preferably situated between the inlet valve and the anode chamber. The supply line can contain oxygen, in particular air, prior to starting up the fuel cell. The absolute amount of hydrogen which is introduced per unit of time into the anode chamber and/or the supply line can be set by means of the position of the inlet valve.

The fuel cell system can contain a recirculation line in order to reintroduce the anode outlet stream into the anode chamber. The reintroduction is referred to as recirculation. The recirculated anode outlet stream can be mixed with the hydrogen stream from the hydrogen tank upstream of the anode chamber. The recirculated anode outlet stream and the hydrogen stream from the hydrogen tank form in this case the anode inlet stream. The supply line can contain a mixing point, at which the recirculation line ends. A recirculation means for the reintroduction of the anode outlet stream can be designed as a fan. The recirculation means can be disposed in the recirculation line.

An open-loop and/or closed-loop control unit is provided in the fuel system. The open-loop and/or closed-loop control unit can, e.g., control the inlet valve and/or the recirculation means.

The ratio of hydrogen to oxygen which is supposed to be present at the beginning of the hydrogen introduction stage is referred to as the desired ratio. A maximum absolute amount of hydrogen which is introduced per unit of time into the anode chamber is set as the absolute amount of hydrogen which can be introduced into the anode chamber per unit of time in order to obtain the desired ratio. This maximum amount is not exceeded during the entire start-up of the fuel cell. The inlet valve is particularly set at the beginning of the hydrogen introduction stage in such a way that the desired ratio is achieved. The inlet valve is particularly not further opened as long as oxygen is present in the anode chamber.

During the start-up process, the mole fraction of the oxygen in the anode chamber drops due to the reaction of the hydrogen with the oxygen of the anode chamber. It is thus conceivable that, in the course of the start-up process, the ratio of hydrogen to oxygen moves above the desired ratio if the absolute amount of hydrogen which is introduced per unit of time into the anode chamber remains constant during the start-up process or drops only slightly. This course of the start-up process is included in the concept of the invention.

The introduction of hydrogen preferably remains constant during the start-up process until oxygen is no longer present in the anode chamber. That means the absolute amount of hydrogen which is introduced per unit of time into the anode chamber remains constant until oxygen is no longer present on the anode side. Particularly the position of the inlet valve is not changed here or rather remains unchanged.

Oxygen is preferably first introduced into the cathode chamber if there is no longer oxygen present on the anode side. In particular, a compressor is only switched on if oxygen is no longer present on the anode side. It has been proven experimentally that, prior to introducing oxygen into the cathode chamber, the membrane is not damaged by a pressure difference to be expected between the anode and the cathode chamber.

A period of time which is required to allow the oxygen to completely react on the anode side, is referred to below as the reaction time period. The reaction time period can particularly be between 0.1 milliseconds and ten seconds, preferably between 1 and 3 seconds. The reaction time period is ended if there is no longer oxygen present on the anode side. The term "no longer oxygen" means that the amount of oxygen on the anode side corresponds to the amount of oxygen during a normal operation of the fuel cell. The term "on the anode side" includes here a total volume from which the oxygen has to be removed. The total volume is the volume from which oxygen can move into the anode chamber by means of the anode inlet stream. The total volume can, e.g., include the anode chamber, the anode and the recirculation and supply lines.

The reaction time period can be estimated and particularly be established as a predefined value in the method. The predefined value can, for example, be stored for the reaction time period in the open-loop and/or closed-loop control system. The reaction time period can alternatively be determined from the total amount of hydrogen that was introduced into the anode chamber and the known total volume at the known oxygen mole fraction at the beginning of the method. The total volume can be deposited in the open-loop and/or closed loop control unit. The determination of the reaction time period can be carried out in said open-loop and/or closed-loop control unit. The oxygen mole fraction can in this case be deposited as a predefined value or be measured.

The steps of the method described above can therefore mean that the introduction of hydrogen remains constant during the start-up process until, according to estimated measures, oxygen is no longer present on the anode side and/or that oxygen is first introduced into the cathode chamber and/or electric power is first extracted if, according to estimated measures, oxygen is no longer present on the anode side.

The open-loop and/or closed-loop control unit sets the desired ratio. The position of the inlet valve that is required to obtain the desired ratio can particularly be predefined as a fixed value in the open-loop and/or closed-loop control unit. A pressure can alternatively be measured upstream of the anode chamber and the open-loop and/or closed-loop control unit can set the inlet valve such that a certain change in pressure is achieved upstream of the anode chamber. The pressure or the pressure differential can be deposited in said open-loop and/or closed-loop control unit as a fixed value. Said open-loop and/or closed-loop control unit can alternatively calculate the required change in pressure, from which the desired ratio results, from the pressure prior to the opening of the inlet valve and the proportion of oxygen which—measured or estimated—is situated in the anode chamber. It is also alternatively conceivable that the hydrogen and/or oxygen concentration is measured prior to entry into the anode chamber and said open-loop and/or closed-loop control unit sets the intake valve on the basis of these values.

Hydrogen can preferably be introduced such that the hydrogen and the oxygen are in the desired ratio in the supply line. Hydrogen and oxygen can thus be at least partially, preferably totally, mixed. In this way, the desired ratio can be achieved upon entry into the anode chamber. According to the invention, provision is particularly made at the beginning of the hydrogen introduction stage for enough hydrogen to be introduced to ensure that hydrogen and oxygen are present in no more than a stoichiometric ratio or in another desired ratio in the supply line.

In a preferred manner, the anode outlet stream is reintroduced into the anode chamber during the start-up process. The anode outlet stream is especially completely reintroduced into the anode chamber. The recirculation enables the complete reaction of the oxygen in the anode chamber as well as in the recirculation line. The desired ratio at the beginning of the hydrogen introduction stage can be achieved in the anode inlet stream, in particular at the mixing point. In particular, the anode outlet stream is reintroduced to the anode chamber at full speed. The maximum recirculation speed provided for the fuel cell system is referred to as full speed.

It is conceivable that an outlet valve is already or is closed prior to the introduction of the hydrogen into the anode chamber. It may be the case that the closed position is controlled prior to the introduction of the hydrogen. In addition, a recirculation means can be switched on for the reintroduction of the anode outlet stream into the anode chamber prior to introducing hydrogen into the anode chamber, in particular after closing the outlet valve.

Oxygen is present in the anode chamber particularly after a lengthy stoppage of the fuel cell. For example, an oxygen mole fraction arises in a cathode chamber open to the ambient environment quickly after the fuel cell has stopped which is equal to that of said ambient environment, namely as rule 0.21. The oxygen moves by means of diffusion into the anode chamber, where the oxygen reacts with the hydrogen. In the case of the fuel cell being stopped for longer periods of time, the hydrogen completely reacts; and the oxygen of the anode chamber and the oxygen of the cathode chamber are in equilibrium. As a rule, an oxygen mole fraction of 0.21 and a pressure of 1 atm are present in the anode chamber after a lengthy stoppage. The method can be attuned accordingly. The values, which are deposited in the open-loop and/or closed-loop control unit, for a position of the inlet valve, for a mole fraction of the oxygen, for a reaction time period and/or for a pressure to be set upstream of the anode chamber can be based on the aforementioned values.

In order to prevent an unnecessary time delay when starting up the fuel cell, provision can be made for the steps of the method to only then be carried out if it is to be expected that the hydrogen in the anode chamber has completely reacted. To this end, a query can be made whether a predefined period of time since stopping the fuel cell has been exceeded. The predefined period of time can, e.g., be fixed between three to five hours. When using the method in a fuel cell vehicle, the predefined steps of the method can alternatively be carried out each time the ignition key is inserted, in particular early on in the process.

The method may end up with the oxygen being introduced into the cathode chamber and a current circuit of the fuel cell being closed. The position of the inlet valve can only be set according to the required electrical output of the fuel cell.

In a preferred manner, provision can be made for the following order of the steps of the method: a check can, e.g., initially be made whether a predefined period of time has been exceeded since the fuel cell was last stopped. A check is subsequently made whether the outlet valve is closed and the recirculation line is open. The recirculation means is then switched on, in particular at maximum capacity. The inlet valve is opened to such an extent that the desired ratio of hydrogen to oxygen arises in the anode inlet stream, in particular at the mixing point. If air is present in the anode chamber prior to the start-up process, the mole fraction of the hydrogen in the anode inlet stream is no more than 0.42 at the beginning of the hydrogen introduction stage. The mole fraction of the hydrogen in the anode inlet stream is preferably less than 0.21 at the beginning of the hydrogen introduction stage. In a particularly preferred manner, the mole fraction lies between 0.09 and 0.13. The position of the inlet valve is preferably held constant during the reaction time period. If the reaction time period is exceeded, the open-loop and/or closed-loop control unit can ensure that a current circuit comprising a load and the fuel cell is closed, that oxygen is fed to the cathode, particularly that a compressor is switched on and that the introduction of hydrogen is controlled according to the required electrical output of the fuel cell. The starting up of the fuel cell is ended so that a normal operation of the fuel cell occurs.

The aim of the present invention is also met by a fuel cell system comprising a fuel cell, which has an anode chamber and a cathode chamber, a hydrogen tank, an inlet valve for metering an introduction of hydrogen into an anode chamber and an open-loop and/or closed-loop control unit. The open-loop and/or closed-loop control unit is designed in such a way that, at the beginning of a start-up process, the inlet valve is only opened to such an extent that enough hydrogen is introduced to ensure that upon entry into the anode chamber hydrogen and oxygen are present in no more than a stoichiometric ratio. The fuel cell system can have a recirculation means for reintroducing an anode outlet stream into the anode chamber, wherein the open-loop and/or closed-loop control unit switches on the recirculation means at maximum capacity prior to the opening of the inlet valve. A method previously described is particularly deposited in the open-loop and/or closed-loop control unit.

The fuel cell can relate to a polymer electrolyte membrane (PEM) fuel cell. Instead of a single fuel cell, a stack of fuel cells can also be used. In this case, the chamber at the anodes of all of the fuel cells is referred to as the anode chamber. The fuel cell can be disposed in a fuel cell vehicle.

BRIEF DESCRIPTION OF THE DRAWINGS

Further measures which improve the invention ensue from the following description with regard to the exemplary embodiments of the invention, which are schematically depicted in the drawings. All of the features and/or advantages, including constructive details, of spatial arrangement and steps of the method, which arise from the claims, the description or the drawings, can be essential to the invention in isolation as well as in a variety of combinations. In the drawings:

DETAILED DESCRIPTION

Figure 1:
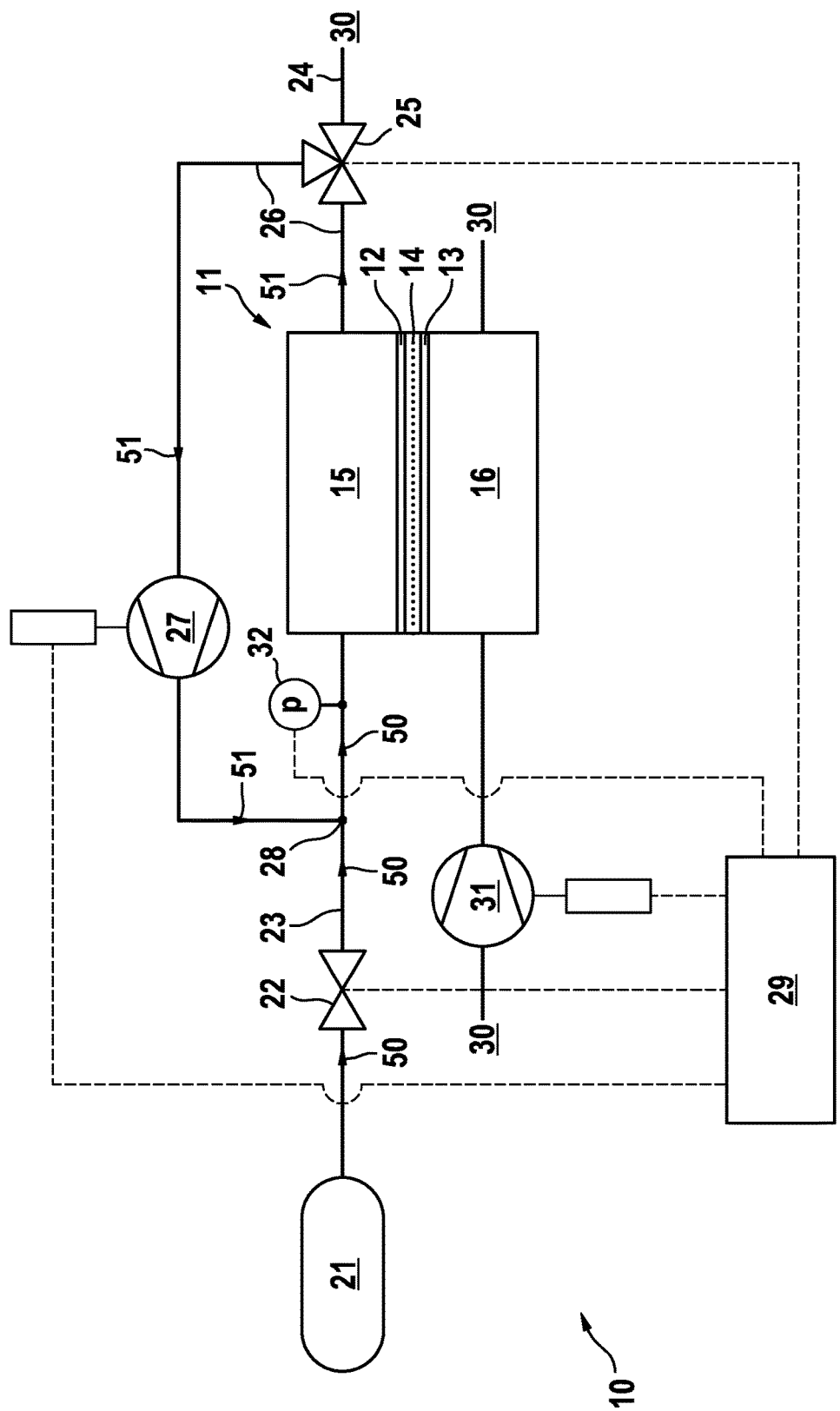
FIG. 1 shows a fuel cell system according to the invention.

A fuel cell system 10 according to the invention is depicted in FIG. 1. The fuel cell system 10 comprises a fuel cell stack, of which only one fuel cell 11 is exemplarily depicted in FIG. 1. The fuel cells 11 of the fuel cell stack are designed as PEM fuel cells. Each fuel cell 11 has an anode 12, a cathode 13 and a membrane 14 as an electrolyte lying between said anode and cathode. During the operation of the fuel cell system 10, hydrogen is introduced via an anode chamber of the anode 12 and air containing oxygen via a cathode chamber 16 of the cathode 13. The hydrogen and the oxygen are electrochemically converted to water during the operation of the fuel cells 11, wherein an electrical output is generated.

In order to provide hydrogen to the fuel cells 11, the fuel cell system 10 has a hydrogen tank 21 comprising a pressure reducer, which is not depicted, an adjustable inlet valve 22 and a supply line 23 which is attached thereto. The supply line 23 ends at the anode chamber 15. The hydrogen flows according to the arrows 50 to the anode chamber 15. A recirculation line 26 is connected to the anode chamber 15 in order to be able to reintroduce hydrogen, which did not react during operation, into the fuel cell 11. A fan 27 is provided as the recirculation means in the recirculation line 26, said fan guiding an anode outlet stream according to the arrows 51 back to the supply line 23. The recirculation line 26 ends at a mixing point 28 in the supply line 23. A pressure sensor 32 measures the pressure in the supply line 23. The anode outlet stream is defined as a volume flow which leaves the anode chamber 15.

A 3/2 directional control valve 25 is used as the outlet valve, which both facilitates and prevents a recirculation. Via the 3/2 directional control valve 25, the exhaust can be released through an outlet line 24 into the ambient environment 30. The air containing oxygen is led from the ambient environment 30 into the cathode chamber 16 by means of a compressor 31 and released to the ambient environment 30 after passing through the fuel cell 11.

The fuel cell system 10 has an open-loop and/or closed-loop control unit 29, which monitors and adjusts the position of the inlet valve 22, the position of the 3/2 directional control valve 25 and the electrical output of the fan 27 and of the compressor 31. The open-loop and/or closed-loop control unit 29 receives measured pressure values for the anode inlet stream from a pressure sensor 32. The following inventive method, which is depicted in FIG. 2, is deposited in the open-loop and/or closed-loop control unit 29.

Figure 2:
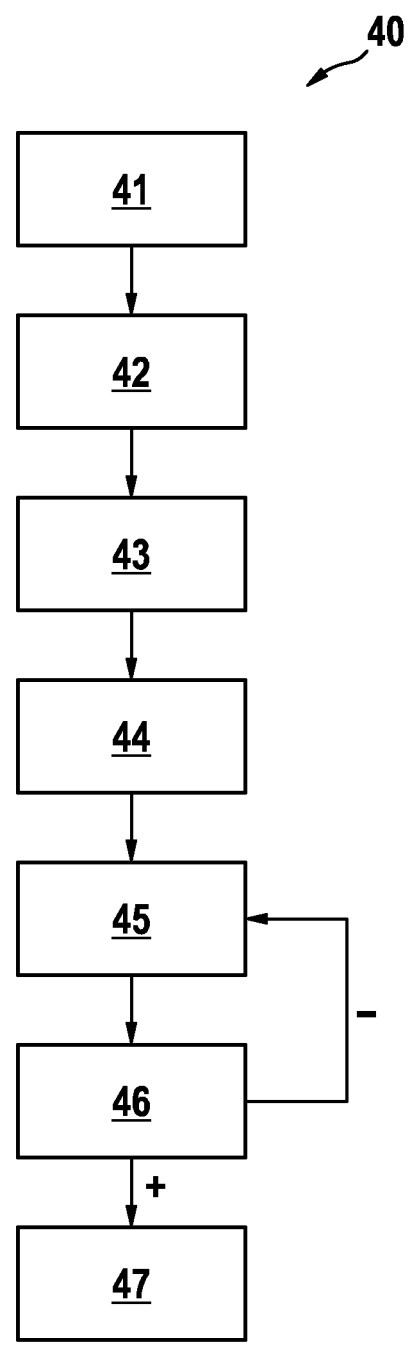
FIG. 2 shows a method according to the invention.

In FIG. 2, an exemplary embodiment for a method 40 according to the invention is depicted. At the beginning of the method, air is contained in the anode chamber 15, in the supply line 23 and in the recirculation line 26. In a first step 41 of the method, a check is made whether a predefined period of time has been exceeded since the fuel cell 11 was last stopped. In a second step 42, the position of the 3/2 directional control valve 25 is checked. The 3/2 directional control valve should be open to the recirculation line 26 and closed to the outlet line 24. In a third step 43 of the method, the fan 27 is switched on at maximum capacity. In so doing, the air which is situated in the anode chamber 15, in the supply line 23, in the recirculation line 26 and in the outlet line 24 is moved at maximum speed according to the arrows 50, 51.

In a fourth step 44 of the method, the inlet valve 22 is subsequently brought into a position which was predefined in the open-loop and/or closed-loop control device 29 and by means of which a predefined pressure at the pressure sensor 32 can be measured. In the adjusted position of the inlet valve 22, the ratio of the hydrogen to oxygen at the mixing point 28 corresponds to the desired ratio, e.g., the mole fraction of the hydrogen can be 0.13 at the mixing point 28.

In a fifth step 45 of the method, the period of time that the inlet valve 22 has been opened is detected. In a sixth step 46 of the method, a query is made whether the period of time corresponds to the reaction time period defined in the open-loop and/or closed-loop control unit 29. If this is not yet the case, which is depicted with "−" in FIG. 2, the steps 45 and 46 of the method are then repeated. If the predefined period of time has been achieved, which is depicted with "+" in FIG. 2, the compressor 31 is then switched on in a seventh step 47 of the method; the required hydrogen volume flow is introduced into the anode chamber 15 and, if required, an anode inlet pressure is adjusted. A current circuit of the fuel cell 11, which is not depicted, is subsequently closed. The position of the inlet valve 22 can be adjusted according to the required electrical output of the fuel cells 11. In the event that less than 0.79 bar of nitrogen is supposed to be present in the anode chamber 15, the anode outlet stream has to be discharged out of the anode chamber 15 via the outlet valve 25 out of the fuel cell system 10.

The method for starting up the fuel cells 11 is thus finished. Particularly the first, second, and/or seventh step 41, 42, 47 of the method can optionally be omitted.

The invention claimed is:

1. A method (40) for starting a fuel cell (11), wherein hydrogen is supplied to an anode chamber (15) of the fuel cell (11) and, at the beginning of starting the fuel cell, oxygen is present in the anode chamber (15) of the fuel cell (11), the method comprising
at the beginning of supplying the hydrogen, supplying enough hydrogen to the anode chamber (15) that the hydrogen is at most in a stoichiometric ratio with the amount of oxygen present in the anode chamber (15),
wherein, at the beginning of supplying the hydrogen, the molar fraction of the hydrogen within a volume segment of an anode inlet stream prior to entry into the fuel cell (11) lies below the molar fraction of the oxygen present in the anode chamber (15), wherein the molar faction of the hydrogen within the volume segment of the anode inlet stream lies between 0.09 and 0.13, and wherein an inlet valve (22) for metering a supply of hydrogen is not opened any further as long as oxygen is present in the anode chamber.

2. A method according to claim 1, characterized in that the supplying of hydrogen remains constant during starting of the fuel cell until no more oxygen is present on an anode side.

3. A method according to claim 1, characterized in that, during starting of the fuel cell, an anode outlet stream is re-supplied to the anode chamber (15).

4. A method according to claim 1, characterized in that, before supplying the hydrogen to the anode chamber (15), an outlet valve (25) is closed.

5. A method according to claim 1, characterized in that, before supplying the hydrogen to the anode chamber (15), a recirculation means (27) is switched on for re-supplying an anode outlet stream to the anode chamber (15).

6. A method according to claim 2, characterized in that, during starting of the fuel cell, an anode outlet stream is re-supplied to the anode chamber (15).

7. A method according to claim 6, characterized in that, before supplying the hydrogen to the anode chamber (15), an outlet valve (25) is closed.

8. A method according to claim 7, characterized in that, before supplying the hydrogen to the anode chamber (15), a recirculation means (27) is switched on for re-supplying the anode outlet stream to the anode chamber (15).

* * * * *